United States Patent Office 3,835,111
Patented Sept. 10, 1974

3,835,111
SLOW-SET PECTIN AND PROCESS FOR
PREPARING SAME
Robert M. Ehrlich, Sherman Oaks, and Raymond E. Cox, Laguna Beach, Calif., assignors to General Foods Corporation, White Plains, N.Y.
No Drawing. Continuation-in-part of abandoned application Ser. No. 6,923, Jan. 29, 1970. This application Aug. 3, 1973, Ser. No. 385,389
Int. Cl. A23l 1/04; C08b 19/02
U.S. Cl. 260—209.5
9 Claims

ABSTRACT OF THE DISCLOSURE

An improved slow-set pectin is prepared by contacting pectin with an ammoniacal alcohol solution at low temperature. The pectin so obtained has less sensitivity to alkaline earth metal ions and has a setting temperature of about 120° F. or less.

---

This application is a continuation-in-part of our co-pending application, Ser. No. 6,923, filed Jan. 29, 1970, and now abandoned.

Among other trade designations, pectins are frequently characterized as being rapid-setting or slow-setting. Typically, the rapid-setting pectins, standardized to 150 grade, have a degree of methylation (D.M.) in the range of about 68 to 83. Slow-setting pectins, also standardized to 150 grade, usually have a D.M. of 60 to 65 and the setting temperature of these pectins in a jelly at 65% soluble solids and pH of 3 may vary between 125° and 155° F. Generally, slow-setting pectins are prepared by pectin manufacturers by demethylating pectin employing isopropyl alcohol with either sulfuric acid or hydrochloric acid as the catalyst. During this demethylation step, the pectin is converted from one having a D.M. of approximately 68 to 76 to a pectin with a D.M. of approximately 61 to 63. A typical, commercially available slow-set pectin may have the following approximate distribution of total carboxyl groups, based on the total number of galacturonic acid units: methyl esters—60 to 65%; free carboxyls—17.5 to 20%; and sodium or ammonium salts—17.5 to 20%. When employed in the manufacture of jellies, jams and preserves, many of the available slow-set pectins are characterized by their sensitivity to alkaline earth metal ions and also by their rather high setting temperatures. For example, slow-set pectins with sensitivity toward alkaline earth metal ions may react with divalent and trivalent metal ions, particularly calcium ions, which are present in fruit juices. Under certain conditions of pectin concentration, temperature, pH and sugar concentration, a premature gelation of the pectin may take place. The result of the interaction between such pectin and alkaline earth metal ions, especially in the vacuum pan processing of jellies, jams and preserves, is a lessening of the gel strength or even a complete failure of the final product which is, of course, undesirable. The reasons why such slow-setting pectin exhibits this sensitivity to alkaline earth metal ions or possesses "calcium sensitivity," as the phenomenon is frequently characterized, is not completely understood. However, it is theorized that the spatial arrangement of the free carboxyl groups within the pectin molecule may play a role but is also believed that the presence of even a small fraction of a low D.M. pectin, that is, a pectin having a D.M. of about 3 to 7, may have an effect.

In addition to the calcium sensitivity of slow-set pectin, many of such pectins are characterized by setting temperatures which are rather high. Inasmuch as low setting temperatures would offer economy and ease of processing in jelly, jam and preserve manufacture, there is a definite need for a slow-set pectin with much lower setting temperatures, for example, in the range of about 120° F. or less.

It is an object of this invention to prepare an improved slow-set pectin having little or no sensitivity towards alkaline earth metal ions.

It is a further object of this invention to prepare a pectin having a D.M. of about 60 to 70 whose setting temperatures are in the range of about 120° F. or less.

It is a still further object of this invention to prepare an improved slow-set pectin having a D.M. of about 60 to 70 with reduced calcium sensitivity by a process which is especially economically attractive.

It has now been discovered that an improved slow-set pectin may be prepared by contacting pectin with an ammoniacal alcohol solution at low temperatures. By this process one is able to obtain a pectin having a D.M. of about 60 to 70 with markedly improved tolerance towards alkaline earth metal ions such as calcium and a pectin which will set at temperatures of about 120° F. or less. Thus, the process which we have unexpectedly discovered is particularly well adapted to provide a less calcium sensitive pectin whose ability to form a gel at low temperatures is enhanced. While the theory underlying the mechanism involved in obtaining the improved slow-set pectin of this invention is not completely understood, it seems that demethylation is ammoniacal alcohol brings about the random introduction of acid amide groups and possibly also ammonium salt moieties into the pectin molecule thereby possibly blocking the carboxyl groups in the molecule with the result that premature gel formation due to the influence of alkaline earth metal ions is avoided. The demethylation in ammoniacal alcohol is carried out at a temperature of about 50° F. or less and it has been discovered that this range of temperatures for demethylation is particularly critical in attaining of a pectin having reduced calcium sensitivity and lower setting temperatures. A range of demethylation temperatures between about −5° F. and 50° F. is also found to be particularly desirable inasmuch as operating at these low temperatures preserves pectin grade and improves grade-pH performance.

Typically, the improved slow-set pectin of this invention may have the following approximate distribution of total carboxyl groups, based on the total number of galacturonic acid units: $COOCH_3$—60 to 70%, $COOH$—26 to 37%, and $CONH_2$—3 to 6%. With reference to this distribution of the total carboxyl groups and with that of heretofore available slow-set pectins, the pectin of this invention may be seen to have a certain number of carboxyl groups converted to amide groups and possibly also ammonium salt groupings. It appears that the ratio of methoxyl ($COOCH_3$) groups to amide ($CONH_2$) groups in the slow-set pectin of this invention is determinative in pectin product performance in a jelly in terms of grade-pH and setting temperature characteristics.

The pectin starting material to be employed in the process of this invention may be obtained from a variety of sources as, for example, citrus fruit peels, apple pomace and the like. Moreover, the pectin so employed may have a rather high D.M. due to the source material or to the method of extraction utilized. In this connection high D.M. pectins appear quite suitable provided they are not inherently calcium sensitive.

In the preparation of slow-set pectin of this invention, it may also be advantageous to first treat pectin with acidified methyl alcohol solution to increase D.M. and also to insure a non-calcium sensitive pectin and to minimize grade loss during later demethylation. The pectin to be so treated may be in the form of dried particles or wet or dried shreds which are prepared as extruded noodles or as a hydrated gel. Alternatively, the pectin to be employed may be one obtained as a precipitate as, for example, by having been treated with an alcohol or certain metal salts. While any of such types of pectin are suitable, the process of this invention is particularly well adapted to be employed using a pectin-metal coprecipitate as the starting material. Thus, such coprecipitate is conventionally obtained in pectin manufacture after the raw material, usually citrus fruit peel, is hydrolyzed and extracted. The extract is filtered and clarified and is then precipitated with a solution of a metal salt such as copper sulfate, aluminum sulfate, copper chloride, aluminum chloride and the like or mixtures. The coprecipitate, commonly called "green" and having a moisture content of about 88%, is treated with an acidified alcohol solution. While other acids may be used, such as hydrochloric acid, phosphoric acid and the like, sulfuric acid is especially preferred and it is by this step of the process the degree of methylation of the pectin is increased to approximately 71 to 76 D.M. Following the treatment with acidified alcohol solution, the pectin which is now essentially free of metals which have been coprecipitated with pectin may be washed with alcohol and water. The pectin is then separated from the treating and washing solutions and is contacted with an ammoniacal alcohol solution at a temperature of less than 50° F. The ammoniacal alcohol solution will typically comprise 1% ammonia, 39% water and 60% methyl alcohol but ammonia concentrations of about 0.5 to 3% and methyl alcohol concentrations of about 60 to 80% may be used. After contacting the pectin with the ammoniacal alcohol solution for a period of about 6 to 24 hours, preferably about 8 to 12 hours, at between about −5° and 50° F., preferably about 0° F., the pectin is demethylated to about 60 to 70 D.M. The pectin so obtained is then washed with a water-alcohol solution and is further treated with an acid alcohol solution to adjust pectin pH thereby coverting some of the salt ($COONH_4$) groups on the pectin molecule to acid ($COOH$) form. The so-adjusted pectin is then subjected to a drying operation as, for example, vacuum drying, for a period of about 6 to 9 hours.

It is apparent that in treating the pectin with an acidified alcohol solution, methyl alcohol must be employed inasmuch as it is desired to increase the degree of methylation of the pectin while at the same time to remove coprecipitating metals, if present, therefrom. On the other hand, during the demethylation step a large number of alcohols besides methyl alcohol such as ethyl alcohol, isopropyl alcohol and the like and mixtures thereof may be employed. However, methyl alcohol is preferred since it offers the advantage of ease in operations and also in any solvent recovery procedures.

In order to illustrate the present invention, the following nonlimiting examples are given:

EXAMPLE I

Into a suitable blender are placed 1000 parts of a pectin-copper sulfate-aluminum sulfate coprecipitate. The coprecipitate is washed with 5000 parts of a solution comprising 5% sulfuric acid, 67% methyl alcohol and the balance water. After washing for one-half hour, the coprecipitate is then treated with a second solution comprising 8.3% sulfuric acid, 79% methyl alcohol and the balance water for 6 to 10 hours at 85° F. The pectin now having a D.M. of approximately 71 to 76, is then leached for two hours with a third solution comprising 2% sulfuric acid, 60% methyl alcohol and the balance water. The pectin is then leached with a neutral 60% alcohol-water solution for two hours to remove trace amounts of acid and color. The leached pectin is next contacted with a solution comprising a 1% ammonia, 60% methyl alcohol and the balance water at 50° F. for 10 hours. Subsequently, the pectin now having a D.M. of 60 to 63 is rinsed twice with a 60% methyl alcohol-water solution and is then pH adjusted with a slightly acidified 60% methyl alcohol solution for about one-half hour. Following an additional rinsing with a 90% methyl alcohol-water solution, the pectin is dried for four hours at 125° F. The analysis on the pectin so obtained is as follows:

Weight, percent $OCH_3$, as is _____ 7.9
Weight percent COOH, as is _____ 6.2
Weight, percent $NH_2$, as is _____ 0.4

Total carboxyl distribution, based on the total number of galacturonic acid units, is:

$COOCH_2$, percent _____ 61
COOH, percent _____ 33
$CONH_2$, percent _____ 6
Equivalent Weight _____ 557
I.F.T. Grade [1], as is _____ 207
I.F.T. Grade, dry basis _____ 223
Setting Time [2], minutes _____ 10

[1] Method described in Food Technology, 1959, vol. XIII, No. 9, pages 496–500.
[2] Method described in Food Technology, vol. III, January 1949, pages 18–22, by Joseph and Baier.

The pectin was then evaluated in a series of samples of 65% soluble solids sugar jellies employing commercially available slow-set pectins (identified as A, B and BB) as controls. A comparison of the pectins for calcium sensitivity, setting temperature, setting time and overall characteristics of the jellies so prepared is tabulated below:

| | Calcium sensitivity | Setting temperature, °F. | Setting time, min. | Slice strength [1] (grape jelly) cms. |
|---|---|---|---|---|
| Product of Example I | Low | 110 | 10 | 101 |
| Product A | High | 140 | 4.5 | 60 |
| Product B | Medium | 130 | 4.5 | 86 |
| Product BB | do | 130 | 4.5 | 88 |

[1] Method described in Analytical Chemistry, vol. 21, March 1949, pages 409–411, by W. A. Bender.

EXAMPLE II

The procedure of Example I is repeated in all essential respects except that the demethylation step is carried out at 32° F. for sixe hours employing a 2% ammonia-methyl alcohol-water solution. The total carboxyl distribution, based on the total number of galacturonic acid units, of the pectin so obtained is shown to be $COOCH_3$—66.1; COOH—29.4%; and $CONH_2$—4.5%. The pectin is characterized by its low calcium sensitivity and by a setting temperature of 95° F.

EXAMPLE III

The procedure of Example I is repeated in all essential respects except that the demethylation step is carried out at 0° F. for eight hours employing a 3% ammonia-methyl alcohol-water solution. The total carboxyl distribution, based on the total number of galacturonic acid units, of the pectin so obtained is shown to be $COOCH_3$—68.4%; COOH—27.8%; and $CONH_2$—3.8%. The pectin is characterized by its low calcium sensitivity and by a setting temperature of 113° F.

EXAMPLE IV

Into a suitable vessel are placed 1140 parts of citrus peel (lemon, orange or grapefruit, fresh or dried in any combination). A dilute hydrochloric acid solution is added to the peel which is then stored up to 24 hours at a pH of 1.3 to hydrolyze protopectin. The stored peel slurry is next diluted at a ratio of 1:2 with water and cooked for ½ to 1 hour at 185° to 200° F. to extract hydrolyzed pectin. An extraction pH of 1.8 is employed with about 0.5% pectin in the liquor. The D.M. of the pectin so obtained is about 68 to 71. The extraction slurry is then clarified employing conventional filtration means and the clarified liquor is vacuum concentrated to about 1500 parts of a concentrate containing 2 to 3% pectin. To the concentrate are then added 3000 parts of 85% methanol. The wet precipitate so obtained is then drained and shredded (torn into strips and pieces). The shreds are then methylated by treatment with 1000 parts of 3.1% HCl: 78% $CH_3OH$ solution at 85° F. for about 6 to 9 hours to 71 to 76 D.M. The methylated shreds are then drained and washed three times, each with 1000 parts of 60% methanol, to remove free HCl.

The washed methylated shreds (175 parts precipitate, 37.5 parts pectin) are then contacted with 1000 parts of an ammoniacal alcohol solution (82.5 parts 24.4% $NH_3$/776 parts 65.4% $CH_3OH$) at 32° F. for about 10 to 16 hours until the shreds have a D.M. of 60 to 68. The demethylated shreds are next drained and washed three times, each with 1000 parts of 60% methanol, to both quench reaction and remove free ammonia.

The washed pectin is pH adjusted by an additional washing in slightly acidified 60% methanol (28 parts 5% HCl/1000 parts 60% $CH_3OH$). The wet resulting pectin precipitate is then vacuum dried for 6 to 9 hours and the dried precipitate is ground in a hammer mill or like equipment to yield 35.5 parts—60 mesh pectin. The product has the following approximate distribution of total carboxyl groups, based on the total number of galacturonic acid units:

|  | Percent |
|---|---|
| $COOCH_3$ | 60 to 68 |
| $COOH$ | 26 to 37 |
| $CONH_2$ | 3 to 6 | to 76 D.M. dried pectin is contacted with about 200 parts of a 1% ammoniacal alcohol: 60% alcohol (methanol, isopropanol or ethanol) solution at 32° F. for about 10 to 16 hours. The demethylated pectin is then drained three times into 200 parts of 60% alcohol washes to both quench the reaction and remove free ammonia. The washed pectin pH is adjusted by washing it in slightly acidified 60% alcohol (37 parts 5% HCl (or 50 parts 5% $H_2SO_4$)/200 parts 60% alcohol). The drained pectin is next dried under vacuum for 6 to 9 hours and is then ground in a hammer mill or similar equipment. There is obtained 47.5 parts of 60-mesh pectin with the following approximate distribution of total carboxyl groups, based on the total number of galacturonic acid units:

|  | Percent |
|---|---|
| $COOCH_3$ | 60 to 68 |
| $COOH$ | 26 to 37 |
| $CONH_2$ | 3 to 6 |

EXAMPLE VII

A series of runs were conducted in which the reaction conditions were varied to determine their effect on the chemical and physical properties of the slow-set pectins so prepared. Sugar jellies, 65% soluble solids, were made from the slow-set pectins so prepared and also evaluated.

The results are summarized below:

| Sample number | Reaction conditions [1] | | | Carboxyl distribution as— | | | IFT grade (dry basis) | 1% viscosity (centipoise) |
|---|---|---|---|---|---|---|---|---|
|  | T,° F. | Percent $NH_3$ | Hours | $COOCH_3$ | $COOH$ | $CONH_2$ |  |  |
| X4697 | 59 | 1.0 | 5.10 | 67.5 | 28.4 | 4.1 | 244 | 35.1 |
| X4698 | 50 | 0.9 | 6.80 | 67.6 | 28.1 | 4.3 | 244 | 44.1 |
| X4699 | 32 | 0.9 | 15.00 | 67.7 | 27.9 | 4.4 | 254 | 63.4 |
| X4693 | 3 | 3.0 | 10.00 | 67.1 | 25.8 | 7.1 | 253 | 84.2 |

| Sample number | Setting | | Ca++ sensitivity (minimum, hours) | 3.05 jelly,[2] pH | | 3.10 jelly,[2] pH | |
|---|---|---|---|---|---|---|---|
|  | Time, seconds | T,° F. |  | Slice strength (centimeters) | Percent pectin savings | Slice (centimeters) | Percent pectin savings |
| X4697 | 375 | 121 | 5 | 72 | 6.7 | 78 | 9.5 |
| X4698 | 330 | 124 | 5 | 89 | 17.4 | 93 | 18.9 |
| X4699 | 335 | 128 | 5 | 98 | 23.2 | 95 | 20.2 |
| X4693 | 440 | 100 | 5 | 116 | 34.7 | 106 | 26.9 |

[1] A 60 percent methyl alcohol concentration was employed in the reaction mixture and a portion of the same methylated pectin shreds was used in each of the demethylation reactions.
[2] The jellies were made with 30 percent less 150-grade pectin or the assumption the pectin grade was greater than 150, for example, 150÷.70=214.4.

EXAMPLE V

The process as described in Example IV is repeated in all essential respects except that a methylation step is not employed inasmuch as higher storage and extraction pHs are utilized thereby resulting in a pectin with a suitably high enough D.M. for the subsequent demethylation step. Principal operating differences, however, are as follows:

The peel is stored up to 24 hours at a pH of 1.7 and the stored slurry is diluted at a ratio of 1:2 with water and cooked for ½ to 1 hour at 185° to 200° F. The extraction pH is about 2.2 resulting in a pectin D.M. of about 73 to 76. Precipitation is accomplished using either methanol, isopropanol or ethanol and the same type of alcohol is used in the demethylation as is used in precipitation. The product has the following approximate distribution of total carboxyl groups, based on the total number of galacturonic acid units:

|  | Percent |
|---|---|
| $COOCH_3$ | 60 to 68 |
| $COOH$ | 26 to 37 |
| $CONH_2$ | 3 to 6 |

EXAMPLE VI

This example illustrates the process of this invention as applied to dried pectin (in the form of powder, shreds or noodles) and which has been either previously methylated or whose D.M. is high enough. Fifty parts of a 71

These results effectively demonstrate significant end product variation with reaction temperature. Thus, pectins demethylated at decreasingly lower temperatures do impart a much improved gel texture to a finished gel as indicated by slice strength values. Also, it is noted that the higher grade, lower setting temperature and higher viscosity trend with lower reaction temperatures. These properties are affected by depolymerization—the lower the temperature, the less depolymerization.

It is further observed that as the reaction temperature is lowered, more amide groups can be put on the pectin molecule for a given D.M. Setting temperature, setting time and breaking strength are significantly affected—setting temperature is lowered; setting time is slower; and less pectin is required for any given slice strength.

The potential economic implications are apparent from the data with respect to "Percent Pectin Savings." Since commercial jellies generally run around 70 to 80 centimeter slice strength, the data shows, for example, at a jelly pH of 3.10 that about 27% less of pectin demethylated at 3° F. is necessary to match the gel texture of jellies prepared from two commercially available slow-set pectin products. Also, the data shows that pectin reduction is approximately doubled by lowering the reaction temperature from 59° to 50° F.

While this invention has been described by reference to specific examples, it is to be understood that it is not to be limited thereto. Thus, for example, the process for

We claim:

1. A process for preparing an improved slow-set pectin having a $CONH_2$ group content of about 3 to 6 percent, based on the total number of galacturonic acid units, which comprises contacting pectin having a D.M. of at least about 71 at a temperature of less than about 50° F. with an ammoniacal alcohol solution at a concentration sufficient and for a period of time sufficient to demethylate said pectin to a D.M. of about 60 to 70.

2. A process as in Claim 1 in which the ammonia concentration of said ammoniacal alcohol solution is from about 0.5 to about 3.0% and said period of time is from about 6 to about 24 hours.

3. A process as in Claim 2 further comprising first treating a pectin with an acidified alcohol solution to methylate said pectin to at least a D.M. of about 71 and then separating said pectin therefrom prior to contacting said pectin with said ammoniacal alcohol solution.

4. A process as in Claim 3 in which said pectin is in the form of a pectin-metal coprecipitate.

5. A process as in Claim 4 in which the alcohol of each of said alcohol solutions is methyl alcohol.

6. A process as in Claim 5 further comprising separating said pectin having a D.M. of about 60 to 70, treating said pectin with an acid and vacuum drying.

7. A process as in Claim 3 further comprising washing said separated pectin with an alcohol prior to contacting said pectin with said ammoniacal alcohol solution.

8. A process as in Claim 6 further comprising washing said separated pectin having a D.M. of about 60 to 70 with an alcohol prior to treating said pectin with said acid.

9. An improved slow-set pectin with low setting temperature and with decreased sensitivity toward alkaline earth metal ions having a D.M. of about 60 to 70, and a $CONH_2$ group content of about 3 to 6 percent, based on the total number of galacturonic acid units.

References Cited

UNITED STATES PATENTS

| | | | |
|---|---|---|---|
| 2,478,170 | 8/1949 | Maclay et al. | 260—209.5 |
| 2,480,710 | 8/1949 | Bryant | 260—209.5 |
| 2,522,970 | 9/1950 | Steiner et al. | 260—209.5 |
| 3,622,559 | 11/1971 | Wiles | 260—209.5 |

FOREIGN PATENTS

| | | | |
|---|---|---|---|
| 2,199,835 | 3/1936 | Australia | 260—209.5 |

DONALD E. CZAJA, Primary Examiner

R. W. GRIFFIN, Assistant Examiner